(12) United States Patent
Bremner et al.

(10) Patent No.: US 7,266,302 B2
(45) Date of Patent: Sep. 4, 2007

(54) ASYMETRIC OPTICAL NETWORK TRAFFIC FLOW CONTROL

(75) Inventors: Duncan J. Bremner, Lochwinnoch (GB); Finn Helmer, Blanefield (GB); Eivind Johansen, Horsholm (DK)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 10/353,426

(22) Filed: Jan. 28, 2003

(65) Prior Publication Data

US 2004/0264973 A1   Dec. 30, 2004

(51) Int. Cl.
*H04B 10/00* (2006.01)
(52) U.S. Cl. .................................... 398/138; 398/139
(58) Field of Classification Search ........ 398/135–139, 398/87
See application file for complete search history.

(56) References Cited

U.S. PATENT DOCUMENTS 5,349,462 A    9/1994  Defranco et al.
5,602,665 A *  2/1997  Asako ........................ 398/137
2003/0095737 A1* 5/2003  Welch et al. ................. 385/14

FOREIGN PATENT DOCUMENTS

JP      09205452      8/1997
WO      WO 00/48340   8/2000

OTHER PUBLICATIONS

Ronald Kaiser et al., "Optoelectronic/Photonic Integrated Circuits on InP between Technological Feasibility and Commercial Success," Published in IEICE Transactions on Electronics, vol. E85-C, No. 4, Apr. 2002, pp. 1-12.
S.L. Woodward and G.E. Bodeep, "A Full-Duplex Optical Data Link Using Lasers as Transceivers," IEEE Photonics Technology Letters, Sep. 1, 1995, pp. 1060-1062, vol. 7, No. 9, IEEE, Inc., USA.

* cited by examiner

*Primary Examiner*—Christina Leung
(74) *Attorney, Agent, or Firm*—Kevin A. Reif

(57) ABSTRACT

An optical network may be configured dynamically so that a given channel wavelength can operate in either direction over a fiber in a network. Thus, network providers can provision bandwidth according to the traffic characteristics of the network link in question. A plurality of transceiver modules on either side of a fiber may be switched from a transmit mode to a receive mode depending on the desired direction of the channel.

10 Claims, 4 Drawing Sheets

ASYMETRIC OPTICAL NETWORK TRAFFIC FLOW CONTROL

FIELD OF THE INVENTION

An embodiment of the present invention relates to optical networks and, more particularly, to configurable optical networks where the direction of a particular channel may be dynamically allocated depending on traffic demand.

BACKGROUND INFORMATION

The field of optical communications, that is communication using optical fibers, transmitters, receivers, modulators and amplifiers, is becoming more mature and cost competitive. Additionally, in order to manage the increasing demand for bandwidth over an optical fiber, it has become necessary to introduce a technique know as Wave Division Multiplexing (WDM).

WDM technology comes in two basic forms. These include Coarse WDM (CWDM) and Dense WDM (DWDM). Both work in the optical domain, very similar to frequency division multiplexing in the electronic domain. Instead of using a single laser (i.e., single color or wavelength) to communicate across a fiber optic network, WDM uses several different wavelengths to increase the capacity of a single optical fiber by modulating each color with a different data signal and hence increasing the capacity of a single fiber by the number of colors or channels it can carry simultaneously.

By increasing the number of colors carried by a single fiber the number of channels and hence the bandwidth of the fiber is increased. However the traditional method of increasing capacity involves providing transmission 'pairs', each pair comprising one path or wavelength to transmit and another path or wavelength to receive. In some applications, this may not be the ideal provisioning scheme as it limits the traffic in each direction to be approximately equal.

Referring to FIG. 1 it can be seen that the number of channels going from left-right and those running from right-left are fixed and remain in an assigned direction. In particular, FIG. 1 shows a four wavelength (color) channel communication fiber with two colors ($\lambda 1$ and $\lambda 2$) traveling down the fiber in a first direction (i.e., left to right) and a two colors ($\lambda 3$ and $\lambda 4$) traveling down the fiber in a second, opposite direction (i.e., right to left).

On the left hand side of FIG. 1, a laser driver 10 modulates a data stream 12 to drive a laser 14 producing a beam having the wavelength $\lambda 1$. The beam $\lambda 2$ is produced in a similar fashion. The beams are wavelength division multiplexed using for example an array waveguide grating (AWG) 16, and travel as a multiplexed beam across a fiber 18. A similar AWG 20 on the right hand side of the communication channel 18 demodulates the beam into the individual wavelengths ($\lambda 1$ and $\lambda 2$) where they are received by respective photo detectors 22 and amplified by their respective amplifiers 24 to output the original data stream 12. Data channels $\lambda 3$ and $\lambda 4$ work in a similar fashion, only traveling in the opposite direction from right to left.

A drawback to the above design is that the direction a particular channel travels is fixed. This means that unless the original network designers anticipated that an asymmetric traffic profile is warranted, the normal implementation involves assigning an equal numbers of channels (wavelengths) in each direction. However, due to local traffic conditions or circumstances, it may be desirable to provide an asymmetric path between nodes such that, say, the right-left direction can carry more traffic that the left-right direction.

A practical reason for desiring an asymmetric network may be demonstrated by considering the download of a music file or picture file from the World Wide Web (WWW) where the data requesting the song (title, artist, URL etc.) is many times smaller than the downloaded data itself. The effect of this asymmetric demand for bandwidth is that the network provider typically over provisions the upstream paths in order to meet the demands of the downstream paths.

A need may exist to dynamically to permit asymmetrical and programmable bandwidth over an optical fiber in either direction.

DETAILED DESCRIPTION

Described is an apparatus and method to implement WDM technology such that each wavelength (channel) can be configured dynamically to operate in either direction over a fiber in a network. This may have the advantage that the network providers can provision bandwidth according to the traffic characteristics of the network link in question. Furthermore, it may be used to permit a degree of equipment 'sparing', sometimes referred to as equipment redundancy, by permitting channels to be re-allocated or re-directed to carry traffic previously carried by a faulty channel.

Figure 1:
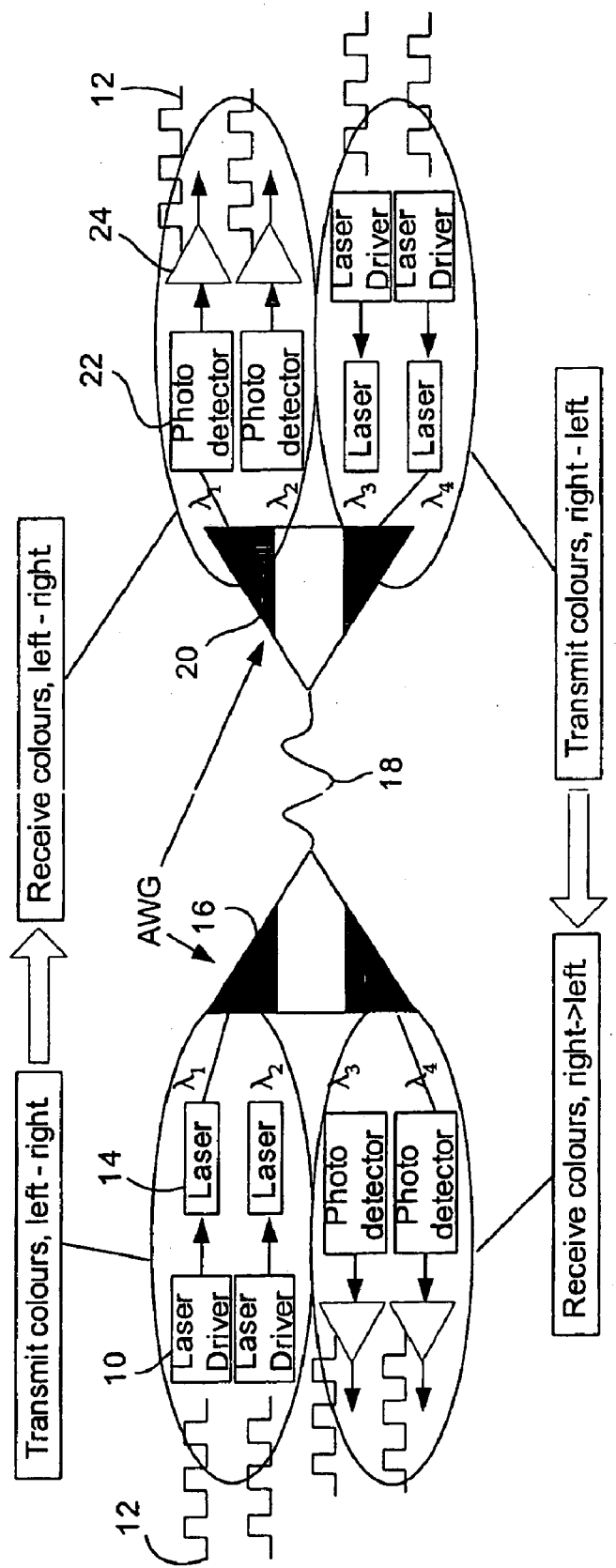
FIG. 1 is a block diagram showing a typical symmetrical multiple channel optical communication system having fixed channel assignment in each direction.
Figure 2:
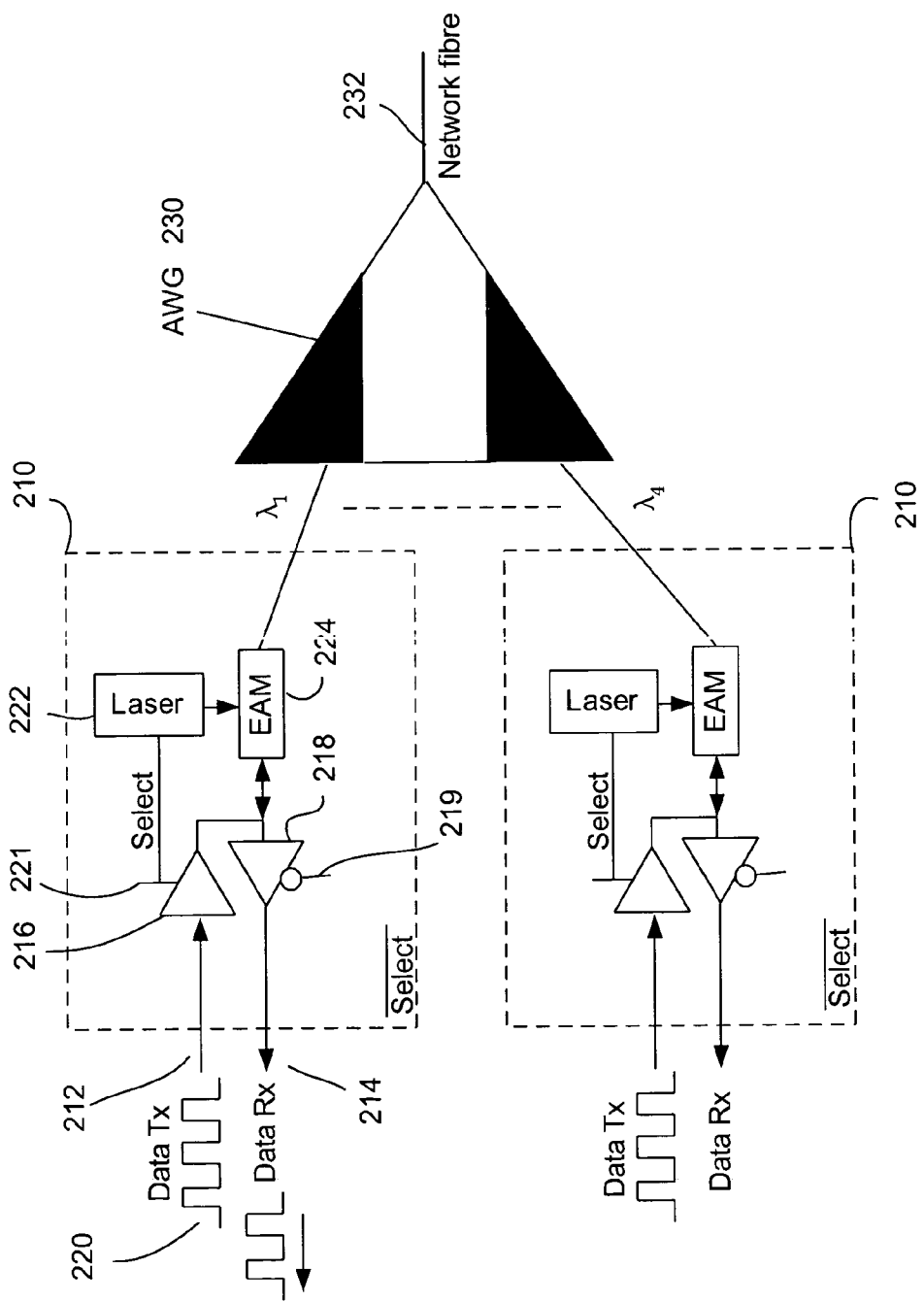
FIG. 2 is a block diagram of one side of a multiple channel optical communication system having an asymmetric, bi-directional configuration according to one embodiment of the invention.

Referring to FIG. 2, for each channel there may be provided a programmable block 210 that can be configured to either transmit or receive a particular channel. Each programmable block 210 includes an input port 212 and an output port 214, and a pair of amplifiers 216 and 218. The amplifiers 216 and 218 comprise select switches 219 and 221 that may be used to activate or disable the respective amplifiers 216 or 218, depending on whether the programmable block 210 is in a transmit mode or a receive mode.

When configured to act as a data transmitter, an input data stream 220 (Data TX) is supplied to the input port 212. The transmit switch 221 is selected to transmit the data and the receive switch 219 is deselected to disable the output port 214. When the transmit switch 221 is selected, a laser 222 is likewise enable to begin lasing at the particular channel's frequency, in this case, $\lambda 1$. The data stream passes through the amplifier 216 and is supplied to a modulator 224 to modulate the beam, $\lambda 1$, from the laser 222.

As shown, an electro-absorption modulator (EAM) 224 may be used to modulate the beam. EAMs generally include a waveguide core and a waveguide cladding. The EAM 224 modulates the light launched into the waveguide by the laser 222 in response to an applied voltage that varies in accordance with the data stream 220 being transmitted. Of course this is but one modulation technique suitable for the present application. It can be appreciated that other modulation techniques may be used and still fall within the scope of the invention The modulated beam from the EAM 224 is multiplexed with other channels (e.g., λ1-λ4) with, for example, an array waveguide grating (AWG) 230. The modulated channels are thereafter transmitted from the output of the AWG 230 over a network fiber 232.

When configured to act as a receiver, a signal is received from the fiber 232 which may be multiplexed with other such channels. In this case the AWG 230 demultiplexes the channels, for example λ1, and sends it to the programmable block 210 designated for λ1. In the receive mode, the transmit switch 221 is deselected thus disabling the input port 212 as well as disabling the laser 222. The receive switch 219 is selected thus allowing the demultiplexed signal to pass through the EAM 224 and the amplifier 218 to the output port 214 (Data Rx).

Figure 3:
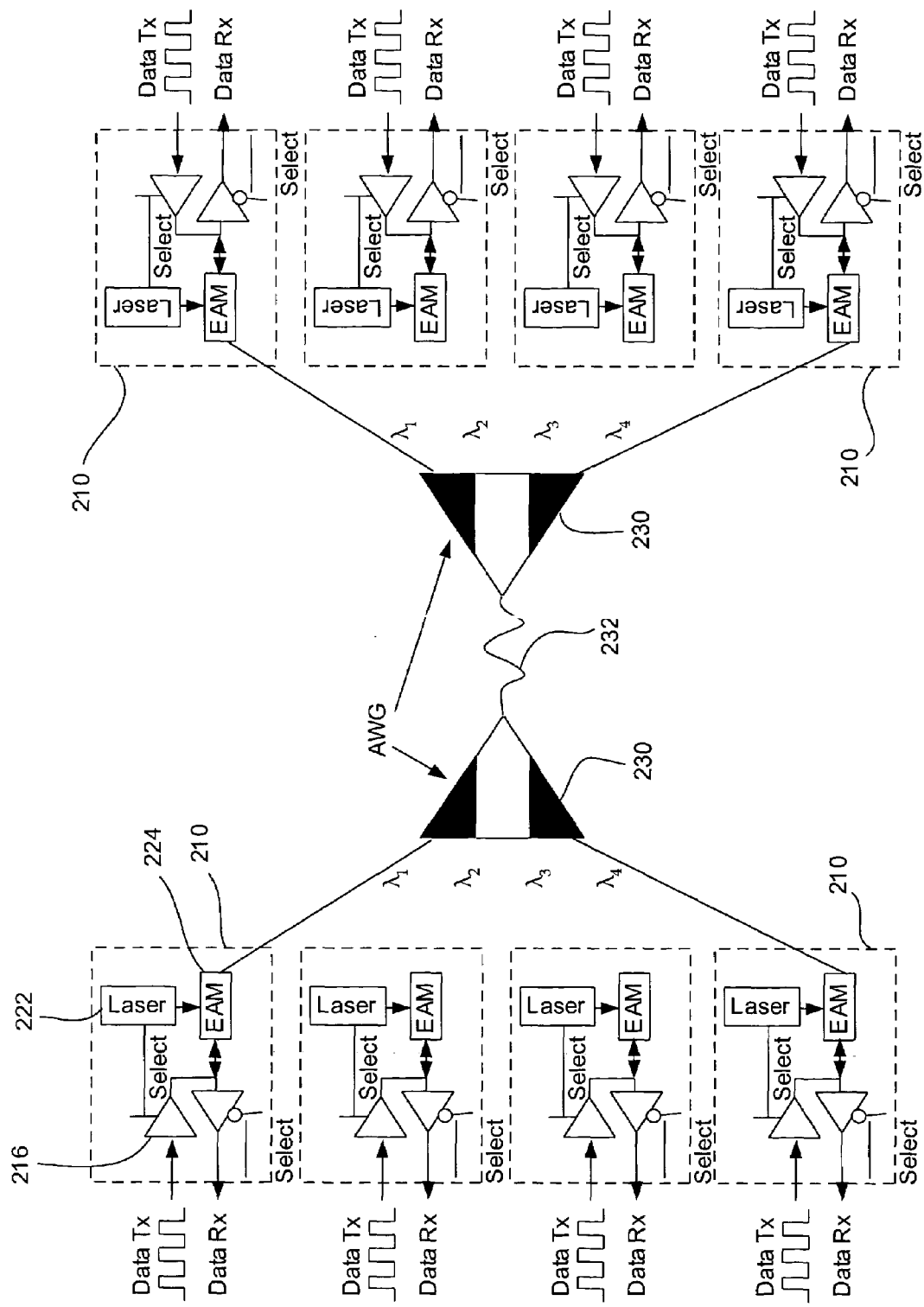
FIG. 3 is a block diagram of a multiple channel optical communication system having an asymmetrical, bi-directional configuration according to one embodiment of the invention.

FIG. 3 shows a fiber network having programmable or "asymmetric" bandwidth allocation according to an embodiment of the invention. As shown, a plurality of programmable blocks or nodes 210 may be connected on either side of a fiber 232. Depending on the polarity of the appropriate 'select' pins, the EAM 224 in each block 210 acts as a receiver or as a modulator. If Select is '1', for example, power may be supplied to the modulator driver amplifier 216 and the laser 222, and the EAM 224 acts as a modulator. If Select is '0', power may be supplied to the receiver amplifier 218 and the EAM 224 acts as a receiver for detecting incoming signals. Traffic flow can be adjusted or programmed by changing the select polarities to change each channel from transmit mode to receive mode and vice-versa. Hence, network traffic with a tidal characteristic (i.e., right to left and then left to right) can be accommodated with the same channel with ease.

Ordinarily, there are many precision interfaces for optical alignment that should be carried out to manufacture optical transceiver modules. These alignments start with the entrance of the fiber to the package that are targeted to be aligned with sub-micron accuracy in six degrees of freedom, to the AWG which, along with the other components on the sub-mount have all been similarly aligned. This is very expensive and time-consuming.

One way to potentially reduce this alignment activity is to reduce the number of alignment procedures. Thus, by manufacturing multiple components in a monolithic manner, for example by manufacturing a number of modulators, equivalent to the desired number of channels as a single component, this reduces the optical alignment challenges considerably. A practical way to produce such monolithic components involves Indium Phosphide (InP) manufacturing techniques. Such techniques may be described by Ronald Kaiser et al., *Optoelectronic/Photonic Integrated Circuits on InP Between Technological Feasibility and Commercial Success,* IEICE Transactions of Electronics, Vol. E85-C, No. 4, April 2002. Due to inherent registration accuracies of the masking process associated with Indium Phosphide (InP) manufacturing, a multi-channel receiver, transmitter, or transceiver can be manufactured very economically.

Figure 4:
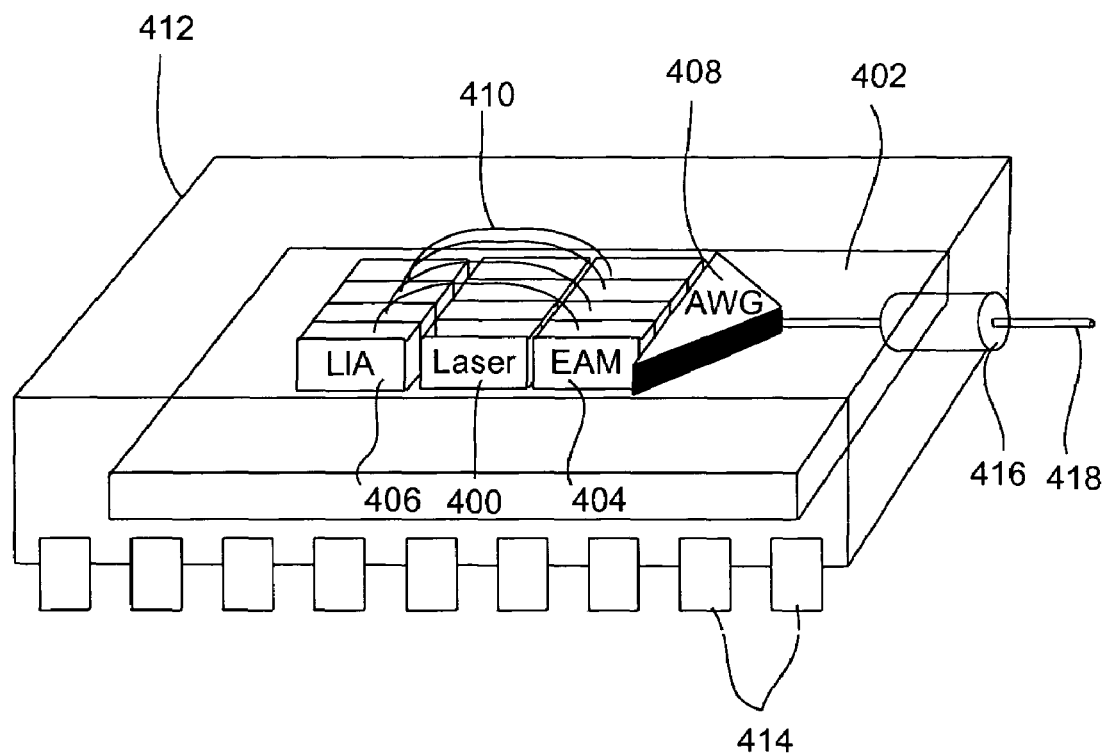
FIG. 4 is a block diagram of a bi-directional transceiver module according to one embodiment of the invention.

Referring to FIG. 4, there is shown a bi-directional "tidal" transceiver module according to an embodiment of the present invention. As shown, the module is compact and components are fabricated together as blocks such that the blocks can be aligned as one unit thus reducing the number of alignment steps. In particular, the module comprises a plurality of tuned laser diodes 400 positioned on a submount 402. A plurality of Electro-Absorption Modulators (EAM) 404 are aligned in front of the lasers 400, and a plurality of limiting amplifiers/modulator drivers (LIAs) 406 are aligned in back of the lasers 400. Bond wires 410 connect the LIA 406 to the EAMs 404 to carry received signals from to EAMs 404 to the LIAs 406 when in receive mode. An array waveguide (AWG) 408 is aligned in front of the EAM 404 and multiplexes or demultiplexes the particular channels on to a fiber 410. A ferrule 416 or other suitable connector may be used to connect the optical fiber 418.

All of the components are encased in a housing 412 having external leads 414. Ones of the leads 414 comprise the select switches 219 and 221 (FIG. 2) for designating the direction of each channel. In a transmit mode, the LIA 406 acts as a modulator. In a receive mode, the LIA 406 acts as a receiver amplifier. The lasers 400, the EAMs 404 and the LIAs 406 may be manufactured as single blocks, using for example Indium Phosphide technology. Where each block contains the number of particular components corresponding to the number of channels handled by the module. This greatly reduces the number of alignment steps required to assemble the module.

Embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An optical network transceiver, comprising:
   an input port to input a transmit data stream;
   an output port to output a received data stream;
   a laser to produce a transmit channel;
   a modulator to modulate the transmit channel with the transmit data for transmission over a fiber in a transmit mode;
   a receiver to receive an incoming channel in a receive mode, said transmit channel and said receive channel having a same wavelength; and
   a select circuit to select between the transmit mode and the receive mode,
   wherein an electro absorption modulator (EAM) includes both said modulator and said receiver, and
   wherein said select circuit comprises a select switch on a limiting amplifier/modulator driver (LIA).

2. The optical network transceiver as recited in claim 1 wherein a plurality of said lasers are configured as a block and a plurality of said EAMs are configured as a block, and a plurality of said LIAs are configured as a block.

3. The optical network transceiver as recited in claim 2 wherein said blocks are fashioned in Indium Phosphide (InP).

4. An asymmetric optical network, comprising:
   an optical fiber network having a first end and a second end;
   at least one first transceiver module at said first end to operate at an assigned channel wavelength;
   at least one second transceiver module at said second end to operate at a same said assigned channel wavelength;
   switches in said first and said second transceiver modules to cause the channel wavelength to operate in either direction between said first end and said second end;
   a plurality of said first transceiver modules at said first end each operating at an assigned wavelength; and a plurality of said second transceiver modules at said second end, each operating at an assigned wavelength corresponding to one of said plurality of first transceiver modules, wherein said switches comprise a select switch on a limiting amplifier/modulator driver (LIA) in each of said transceiver modules.

5. An asymmetric optical network as recited in claim 4, further comprising:

a first array waveguide grating (AWG) between said optical fiber and said plurality of first transceiver modules; and a second AWG between said optical fiber and said plurality of second transceiver modules.

6. An asymmetric optical network as recited in claim 5, further comprising an electro absorption modulator (EAM) in each of said transceiver modules.

7. An asymmetric optical network as recited in claim 6 wherein said EAM comprises both a modulator and a receiver.

8. An asymmetric optical network, comprising:

an optical fiber network having a first end and a second end;

at least one first transceiver module at said first end to operate at an assigned channel wavelength;

at least one second transceiver module at said second end to operate at a same said assigned channel wavelength;

switches in said first and said second transceiver modules to cause the channel wavelength to operate in either direction between said first end and said second end;

a plurality of said first transceiver modules at said first end, each operating at an assigned wavelength; and a plurality of said second transceiver modules at said second end, each operating at an assigned wavelength corresponding to one of said plurality of first transceiver modules, wherein each of said transceiver modules comprise:

a laser to produce said assigned channel wavelength;

an electro absorption modulator (EAM) to modulate the assigned channel wavelength with data for transmission over a fiber in a transmit mode, and to receive an incoming channel in a receive mode; and a limiting amplifier/modulator driver (LIA) comprising said switches.

9. An asymmetric optical network as recited in claim 8, wherein a plurality of said lasers are configured as a block, and a plurality of said EAMs are configured as a block, and a plurality of said LIAs are configured as a block.

10. An asymmetric optical network as recited in claim 9 wherein said blocks are fashioned in Indium Phosphide (InP).

* * * * *